(12) United States Patent
Sumanasekara et al.

(10) Patent No.: US 12,130,038 B2
(45) Date of Patent: *Oct. 29, 2024

(54) RECOVERY MODE ALGORITHM FOR TWO STAGE HVAC EQUIPMENT

(71) Applicant: Tyco Fire & Security GmbH, Neuhausen am Rheinfall (CH)

(72) Inventors: D Gamage Methmini U. M. Sumanasekara, Wichita, KS (US); Andrew M. Boyd, Wichita, KS (US); Theresa N. Gillette, Wichita, KS (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,615

(22) Filed: Apr. 24, 2023

(65) Prior Publication Data

US 2023/0408126 A1    Dec. 21, 2023

Related U.S. Application Data

(63) Continuation of application No. 17/382,142, filed on Jul. 21, 2021, now Pat. No. 11,635,223.

(51) Int. Cl.
  *F24F 11/63*   (2018.01)
  *F24F 11/65*   (2018.01)
  *G05B 15/02*   (2006.01)

(52) U.S. Cl.
  CPC .............. *F24F 11/63* (2018.01); *F24F 11/65* (2018.01); *G05B 15/02* (2013.01); *G05B 2219/2614* (2013.01)

(58) Field of Classification Search
  CPC . G05B 19/042; G05B 2219/2614; F24F 11/65
  See application file for complete search history.

(56) References Cited

U.S. PATENT DOCUMENTS

| 4,638,942 | A | | 1/1987 | Ballard et al. |
| 5,340,028 | A | * | 8/1994 | Thompson .............. F23N 1/002 |
| | | | | 236/46 E |
| 7,731,096 | B2 | | 6/2010 | Lorenz et al. |
| 8,275,484 | B2 | | 9/2012 | Lorenz et al. |

(Continued)

FOREIGN PATENT DOCUMENTS

CA    2544080 C    1/2011

*Primary Examiner* — Michael W Choi
(74) *Attorney, Agent, or Firm* — Fletcher Yoder, P.C.

(57) ABSTRACT

A system includes two stage HVAC equipment and processing circuitry configured to receive a call for conditioning and, in response to the call for conditioning, execute a recovery mode algorithm. The recovery mode algorithm is configured to determine an elapsed time between the call for conditioning and an ending of a recent cycle and compare the elapsed time to a threshold time period. The recovery mode algorithm is also configured to, in response to the elapsed time being below the threshold time period, determine a first stage up time based on a first function corresponding to the elapsed time being below the threshold time period. The recovery mode algorithm is also configured to, in response to the elapsed time meeting or exceeding the threshold time period, determine a second stage up time based on a second function corresponding to the elapsed time meeting or exceeding the threshold time period.

19 Claims, 9 Drawing Sheets

(56) References Cited

U.S. PATENT DOCUMENTS

| | | | |
|---|---|---|---|
| 8,714,460 B2 | 5/2014 | Santinanavat et al. | |
| 8,764,435 B2 | 7/2014 | Nordberg et al. | |
| 2008/0251590 A1* | 10/2008 | Arneson | F24F 11/64 |
| | | | 62/158 |
| 2013/0096102 A1 | 4/2013 | Baker-Glenn et al. | |
| 2016/0329706 A1* | 11/2016 | Deligiannis | G05B 13/026 |

* cited by examiner

| | VALUES ASSIGNED TO $S_1$ CYCLES | | | | | |
|---|---|---|---|---|---|---|
| | 5TH LATEST CYCLE | 4TH LATEST CYCLE | 3RD LATEST CYCLE | 2ND LATEST CYCLE | 1ST LATEST CYCLE | MINIMUM POSSIBLE WEIGHED SUM ($WS_{MIN}$) |
| | $A_1$ | $B_1$ | $C_1$ | $D_1$ | $E_1$ | $(WS_{MIN}) = A_1 + B_1 + C_1 + D_1 + E_1$ |

170

| | VALUES ASSIGNED TO $S_2$ CYCLES | | | | | |
|---|---|---|---|---|---|---|
| | 5TH LATEST CYCLE | 4TH LATEST CYCLE | 3RD LATEST CYCLE | 2ND LATEST CYCLE | 1ST LATEST CYCLE | MINIMUM POSSIBLE WEIGHED SUM ($WS_{MAX}$) |
| | $A_2$ | $B_2$ | $C_2$ | $D_2$ | $E_2$ | $(WS_{MAX}) = A_2 + B_2 + C_2 + D_2 + E_2$ |

180

| TEST CASE – WEIGHTED SUM | | | | | |
|---|---|---|---|---|---|
| 5TH LATEST CYCLE = $S_1$ | 4TH LATEST CYCLE = $S_1$ | 3RD LATEST CYCLE = $S_2$ | 2ND LATEST CYCLE = $S_1$ | 1ST LATEST CYCLE = $S_2$ | WEIGHED SUM (WS) |
| $A_1$ | $B_1$ | $C_2$ | $D_1$ | $E_2$ | $(WS_{MIN}) = A_1 + B_1 + C_2 + D_1 + E_2$ |

RECOVERY MODE ALGORITHM FOR TWO STAGE HVAC EQUIPMENT

CROSS REFERENCE TO RELATED APPLICATIONS

This application is a continuation of U.S. patent application Ser. No. 17/382,142, entitled "RECOVERY MODE ALGORITHM FOR TWO STAGE HVAC EQUIPMENT," filed Jul. 21, 2021, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments (e.g., enclosed spaces). For example, an HVAC system may include one or more heat exchangers, such as a heat exchanger configured to place an air flow in a heat exchange relationship with a refrigerant of a vapor compression circuit (e.g., evaporator, condenser), a heat exchanger configured to place an air flow in a heat exchange relationship with combustion products (e.g., a furnace), or both. In general, the heat exchange relationship(s) may cause a change in pressures and/or temperatures of the air flow, the refrigerant, the combustion products, or any combination thereof. The air flow may be directed toward the environment (e.g., enclosed space) to change a temperature of the environment. Control features may be employed to control the above-described features such that the temperature of the environment reaches a target temperature.

Multi-stage HVAC equipment, such as a two stage furnace, may be employed to provide heating or cooling at a faster rate and/or more efficiently than single stage HVAC equipment. For example, a two stage furnace may include a first stage operating mode that causes a relatively low heat output or heating rate and a second stage operating mode that causes a relatively high heat output or heating rate. In the context of a furnace, for example, first stage operation may cause a first amount of fuel (e.g., gas) to be directed to burners of the furnace for generating combustion products that provide a first amount of heat over a period of time. Second stage operation may cause a second amount of fuel (e.g., gas) to be directed to the burners of the furnace for generating combustion products providing a second amount of heat over a comparable period of time, where the second amount of fuel is greater than the first amount of fuel and the second amount of heat is greater than the first amount of heat. Other aspects of the furnace, such as speeds of a draft inducing fan or blower that biases the combustion products through heat exchange tubes or coils of the furnace, may be controlled to accommodate the first stage operating mode and the second stage operating mode.

The two stage HVAC equipment may be controlled by a controller that receives a call from a thermostat and determines, in response to the call, if and when to operate the two stage HVAC equipment in the second stage operating mode. Unfortunately, traditional systems may be ill-equipped for determining if and when to initiate second stage operation of the two stage HVAC equipment, leading to inefficient heat exchange and/or lengthy amounts of time to condition the environment (e.g., enclosed space) until the call from the thermostat is satisfied. Further, traditional systems may suffer from compatibility issues associated with certain traditional thermostats and certain two stage HVAC equipment. Accordingly, it is now recognized that improved operation of two stage HVAC equipment (e.g., cooling and heating equipment, such as a furnace) is desired.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a heating, ventilation, and/or air conditioning (HVAC) system includes two stage HVAC equipment and processing circuitry configured to receive a call for conditioning and, in response to the call for conditioning, execute a recovery mode algorithm. The recovery mode algorithm is configured to determine an elapsed time between the call for conditioning and an ending of a recent cycle of the two stage HVAC equipment and compare the elapsed time to a threshold time period. The recovery mode algorithm is also configured to, in response to the elapsed time being below the threshold time period, determine a first stage up time of the two stage HVAC equipment based on a first function corresponding to the elapsed time being below the threshold time period. The recovery mode algorithm is also configured to, in response to the elapsed time meeting or exceeding the threshold time period, determine a second stage up time of the two stage HVAC equipment based on a second function corresponding to the elapsed time meeting or exceeding the threshold time period.

In another embodiment, a controller is configured to control operation of two stage HVAC equipment. The controller includes non-transitory, computer-readable media having instructions stored thereon that, when executed by processing circuitry of the controller, are configured to cause the controller to determine an elapsed time between a call for conditioning received by the controller and an ending of a recent cycle of the two stage HVAC equipment and compare the elapsed time to a threshold time period. The instructions are also configured to cause the controller to, in response to the elapsed time being below the threshold time period, determine a first stage up time of the two stage HVAC equipment based on a first function. The instructions are also configured to cause the controller to, in response to the elapsed time meeting or exceeding the threshold time period, determine an average weighted percentage based on a plurality of values, wherein each value of the plurality of values is associated with a corresponding previous cycle of a plurality of previous cycles of the two stage HVAC equipment and determine whether the average weighted percentage metric falls within a subset of a first plurality of percentage ranges. The instructions are also configured to cause the controller to, in response to the average weighted percentage metric falling within the subset of the first plurality of percentage ranges, determine the second stage up time of the two stage HVAC equipment based on the first function. The instructions are also configured to cause the controller to, in response to the average weighted percentage metric falling outside the subset of the first plurality of percentage ranges, determine the second stage up time of the two stage HVAC equipment based on a second function.

In another embodiment, a multi-stage heating, ventilation, and air conditioning (HVAC) system includes heat exchange tubes configured to receive a heat exchange fluid at a first flow rate corresponding to first stage operation of the multi-stage HVAC system and at a second flow rate corresponding to second stage operation of the multi-stage HVAC system, wherein the second flow rate is greater than the first flow rate and processing circuitry configured to receive a call for conditioning. In response to the call for conditioning, the processing circuitry is configured to determine an elapsed time between the call for conditioning and an ending of a recent cycle of the multi-stage HVAC system and compare the elapsed time to a threshold time period. The processing circuitry is also configured to, in response to the elapsed time being below the threshold time period, determine a first stage up time of the multi-stage HVAC system based on a first function corresponding to the elapsed time being below the threshold time period. The processing circuitry is also configured to, in response to the elapsed time meeting or exceeding the threshold time period, determine a second stage up time of the multi-stage HVAC system based on a second function corresponding to the elapsed time meeting or exceeding the threshold time period.

BRIEF DESCRIPTION OF THE DRAWINGS

Various aspects of this disclosure may be better understood upon reading the following detailed description and upon reference to the drawings in which:

FIG. 7 is an illustration of tables including values for determining a weighted sum and a weighted percentage based on most recent cycles of, for example, a furnace, in accordance with an aspect of the present disclosure;

DETAILED DESCRIPTION

Figure 1:
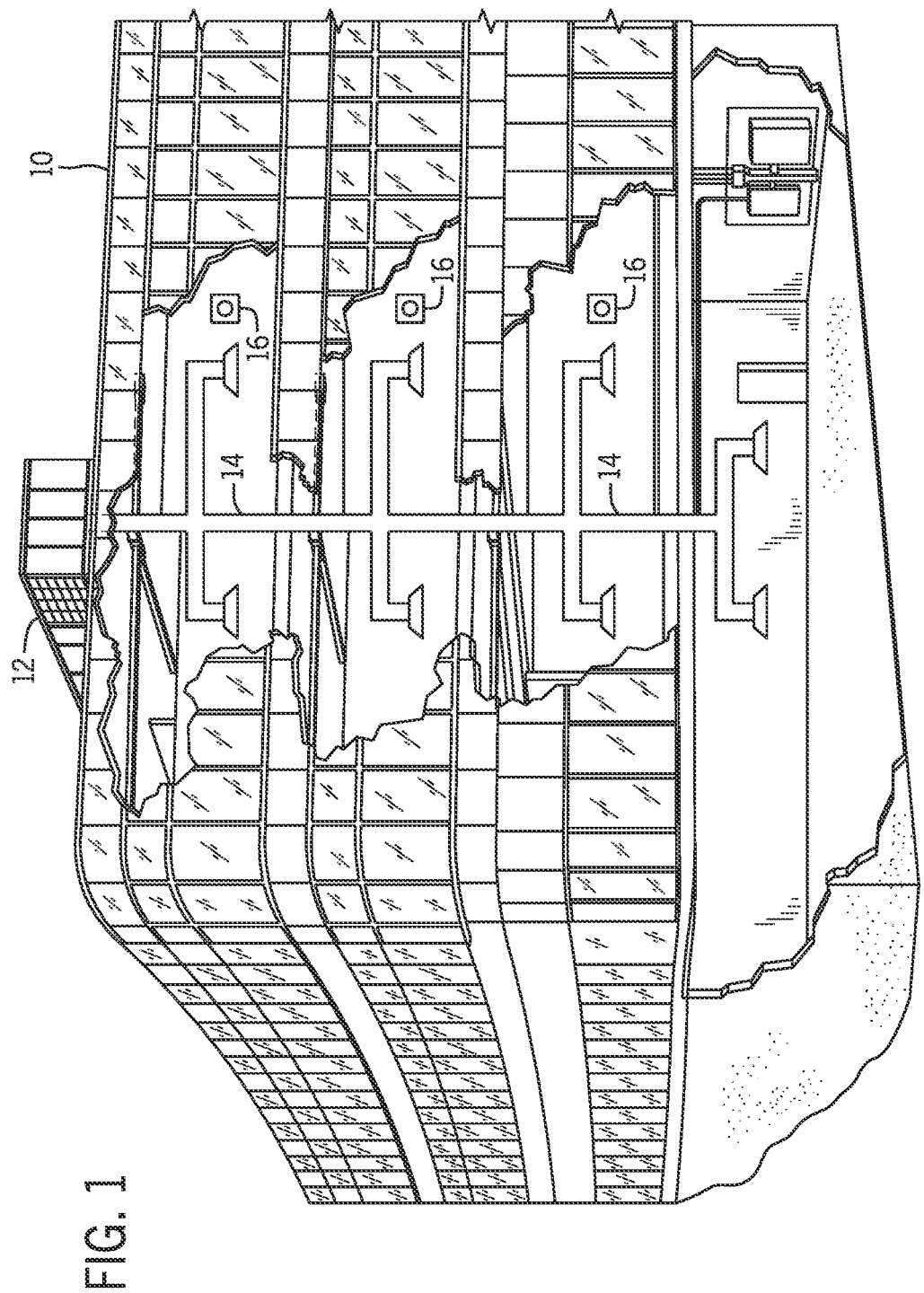
FIG. 1 is a perspective view of an embodiment of a building having a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to two stage HVAC equipment and, more specifically, staging controls of the two stage HVAC equipment, such as a furnace. For example, the present disclosure includes a recovery mode algorithm employed for operating a two stage furnace to determine if and when to initiate second stage operation of the two stage furnace.

In accordance with present embodiments, two stage HVAC equipment, such as a two stage furnace, may be controlled to operate in a first stage operating mode providing a first amount of heat over a period of time and a second stage operating mode providing a second amount of heat over a comparable (e.g., same or similar) period of time, the second amount being greater than the first amount. While two stage furnaces are described in detail below, it should be understood that the recovery mode algorithm described in the present disclosure is also applicable to two stage cooling equipment, such as a refrigerant-based evaporator configured to absorb heat from an air flow, other two stage heating equipment, such as a two stage electric heater, or other two stage HVAC equipment.

The two stage furnace may include one or more burners configured to receive fuel (e.g., gas) from a fuel source. A fuel valve (e.g., gas valve) associated with the two stage furnace may be controlled to supply a first amount of fuel (or first fuel rate) to the burner corresponding to the first stage operating mode and a second amount of fuel (or second fuel rate) to the burner corresponding to the second stage operating mode, where the second amount of fuel or the second fuel rate is greater than the first amount of fuel or first fuel rate. The burners may also receive an oxidant and may ignite a fuel-oxidant mixture to generate combustion products routed through heat exchange tubes or coils of the two stage furnace. The first stage operating mode may generate a smaller amount of combustion products than the second stage operating mode based on the above-described differences in fuel amount or fuel rate. A controller of the two stage furnace may determine if and when second stage operation should be initiated. For example, in certain conditions, second stage operation, which provides a greater amount of combustion products than first stage operation, may enable temperature control of the environment (e.g., enclosed space) at a faster rate than first stage operation. Further, in certain conditions, first stage operation, which provides a lesser amount of combustion products than second stage operation, may enable temperature control of the environment (e.g., enclosed space) in a less expensive or more efficient manner. In general, the controller may determine if and when to initiate second stage operation of the two stage furnace in order to strike a desired balance between conditioning efficiency and conditioning speed.

In certain traditional systems, two stage HVAC equipment, such as two stage furnaces, may be incompatible with single stage thermostats that were designed for single stage HVAC equipment. Further, in certain traditional systems, two stage HVAC equipment, such as two stage furnaces, may be compatible with single stage thermostats but may include controls that are ill-equipped for determining if and when to initiate second state operation in a manner that provides efficient and timely temperature control of the environment (e.g., enclosed space). Further still, in certain traditional systems, two stage HVAC equipment, such as two stage furnaces, may be interface with two stage thermostats, but control aspects associated with the two stage furnace and two stage thermostat may nevertheless be ill-equipped for determining if and when to initiate second state operation in a manner that provides efficient and timely temperature control of the environment (e.g., enclosed space).

In accordance with present embodiments, a controller of the two stage furnace may receive a call from a thermostat (e.g., single stage thermostat or two stage thermostat). The controller may include a processor and a memory, where the memory includes instructions stored thereon that, when executed by the processor, cause the controller to execute a recovery mode algorithm and, based on an output from the recovery mode algorithm, determine a stage up time during which the two stage furnace is operated in the first stage operating mode and after which the two stage furnace is operated in the second stage operating mode (e.g., unless the call from the thermostat is satisfied by the first stage operating mode prior to the stage up time expiring). For example, if the determined stage up time is 12 minutes, the two stage furnace is controlled to operate in the first stage operating mode for at most 12 minutes. If the call from the thermostat is not satisfied by the first stage operating mode before or by expiration of 12 minutes, then the two stage furnace is controlled to operate in the second stage operating mode until the call from the thermostat is satisfied.

The recovery mode algorithm may determine the stage up time based on one or more inputs. For example, an input for the recovery mode algorithm may include data indicative of whether the second stage operating mode was initiated in recent cycles of the two stage furnace. In accordance with the present disclosure, the term "cycle" may refer to a time period beginning when operation of the furnace is initiated in response to a first thermostat call and ending when a second thermostat call after the first thermostat call is received. According to embodiments of the recovery mode algorithm described herein, each previously satisfied call from the thermostat may be associated with a cycle of the two stage furnace that satisfied the call. If the two stage furnace satisfied a previous call from the thermostat via stage one operation but not two stage operation, the cycle associated with the previous call may be considered (e.g., recorded by the controller as) a first stage cycle. If the two stage furnace satisfied a previous call from the thermostat after initiating second stage operation, the cycle associated with the previous call may be considered (e.g., recorded by the controller as) a second stage cycle.

Values may be assigned to first stage cycles and additional values may be assigned to second stage cycles, each of which may be utilized as inputs to the recovery mode algorithm. Thus, a first stage cycle refers to a cycle that was completed without initiating second stage operation, and a second stage cycle refers to a cycle that was completed after initiating second stage operation (e.g., including first stage operation and second stage operation). Certain of the values assigned to second stage cycles may be greater than certain of the values assigned to first stage cycles. For example, a fifth most recent cycle that corresponds to or was recorded as a second stage cycle may be greater than a fifth most recent cycle that corresponds to or was recorded as a first stage cycle. Further, the values assigned to more recent cycles (e.g., first most recent cycle) may be greater than the values assigned to less recent cycles (e.g., fifth most recent cycle).

The above-described input may be a function of a sum (e.g., a weighted sum) of the above-described values. For example, the controller may determine that the most recent cycle (e.g., first most recent cycle) was a second stage cycle, the second most recent cycle was a second stage cycle, the third most recent cycle was a first stage cycle, and so on and so forth. The controller may then sum the above-described values that are associated with the above-described cycles. Because values for second stage cycles may be greater than values for first stage cycles, and because values for more recent cycles may be greater than values for less recent cycles, the sum is referred to herein as a weighted sum.

As a further example, an input for the recovery mode algorithm may include an elapsed time between a current thermostat call and a previous (e.g., most recent) thermostat call. In accordance with the present disclosure, the term "elapsed time" may refer to a time period beginning when operation of the furnace is stopped in response to a first thermostat call being satisfied and ending when a second thermostat call, subsequent to the first thermostat call, is received to initiate operation of the furnace. The elapsed time period may be compared to a threshold time period by the recovery mode algorithm. For example, the two stage furnace may stage up to second stage operation more quickly if the elapsed time meets or exceeds the threshold time period than if the elapsed time is below the threshold time period.

The controller may employ the weighted sum in the recovery mode algorithm, the elapsed time, and the threshold time period, along with one or more other inputs, as described in detail below with reference to the drawings. In general, the above-described weighting technique and corresponding recovery mode algorithm improve heat exchange efficiency and/or reduce conditioning time relative to traditional embodiments.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration loop to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
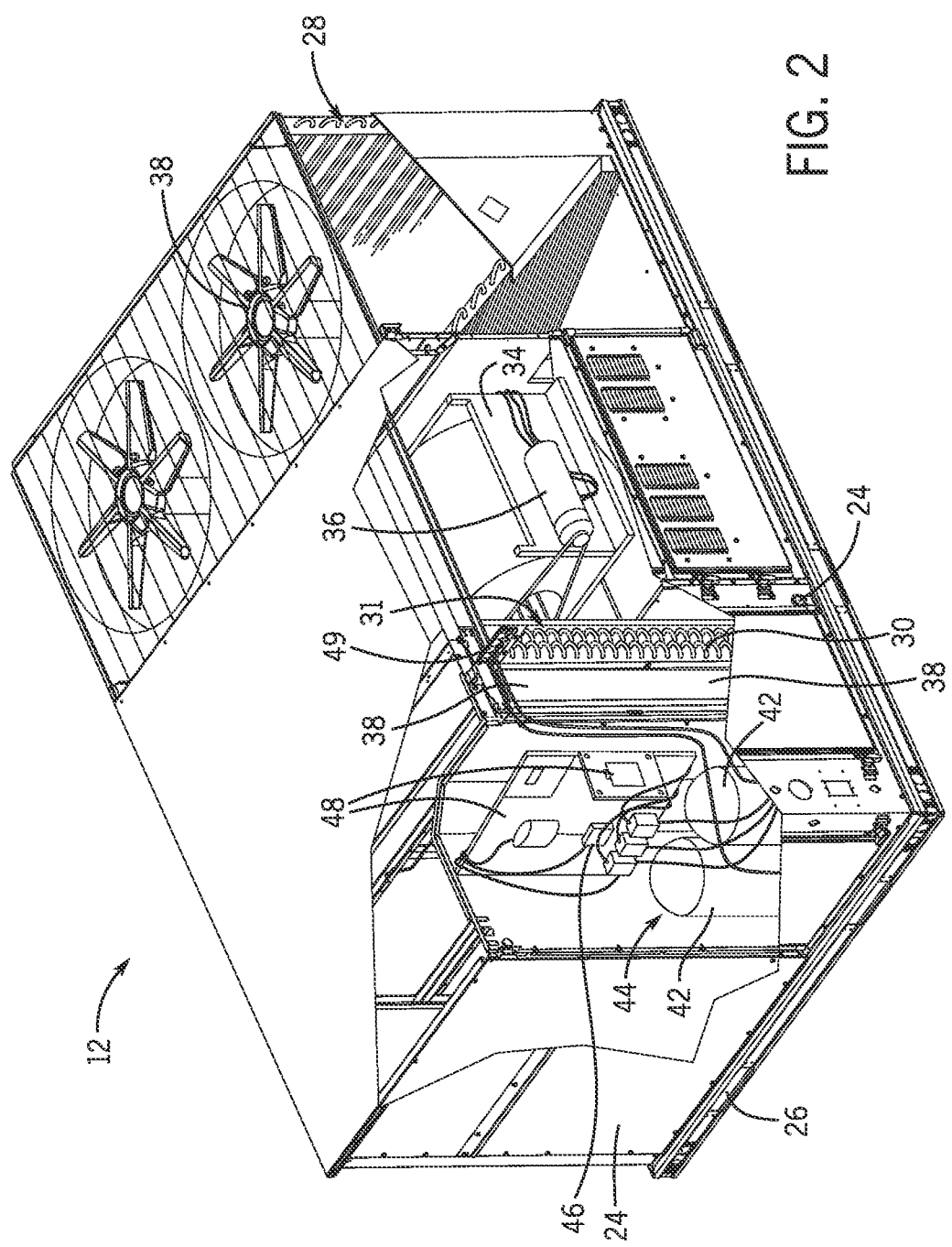
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal loop in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal loop. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
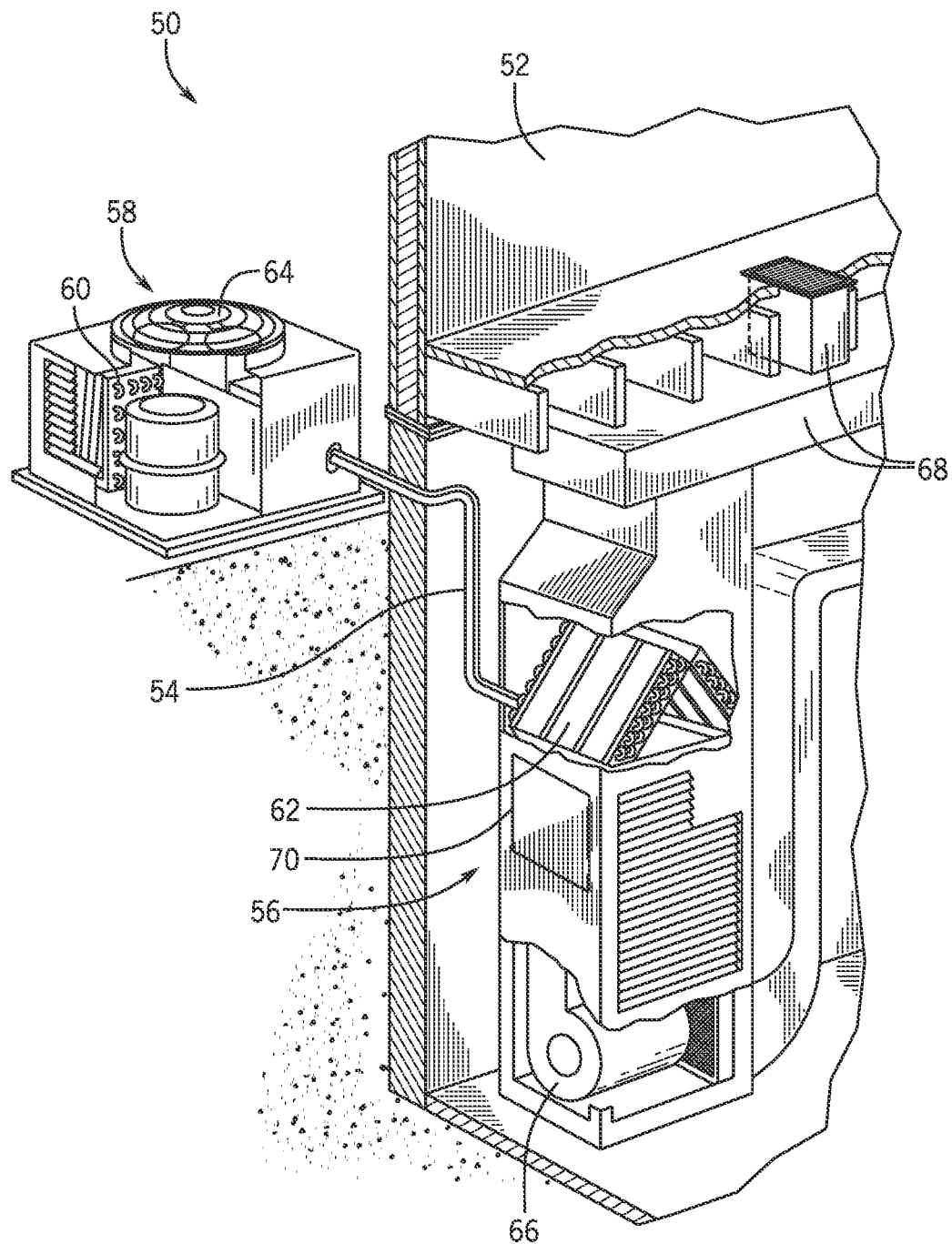
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration loop temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower or fan 66 passes over the tubes or pipes and extracts heat from the combustion products. The heated air may then be routed from the furnace system 70 to the ductwork 68 for heating the residence 52.

Figure 4:
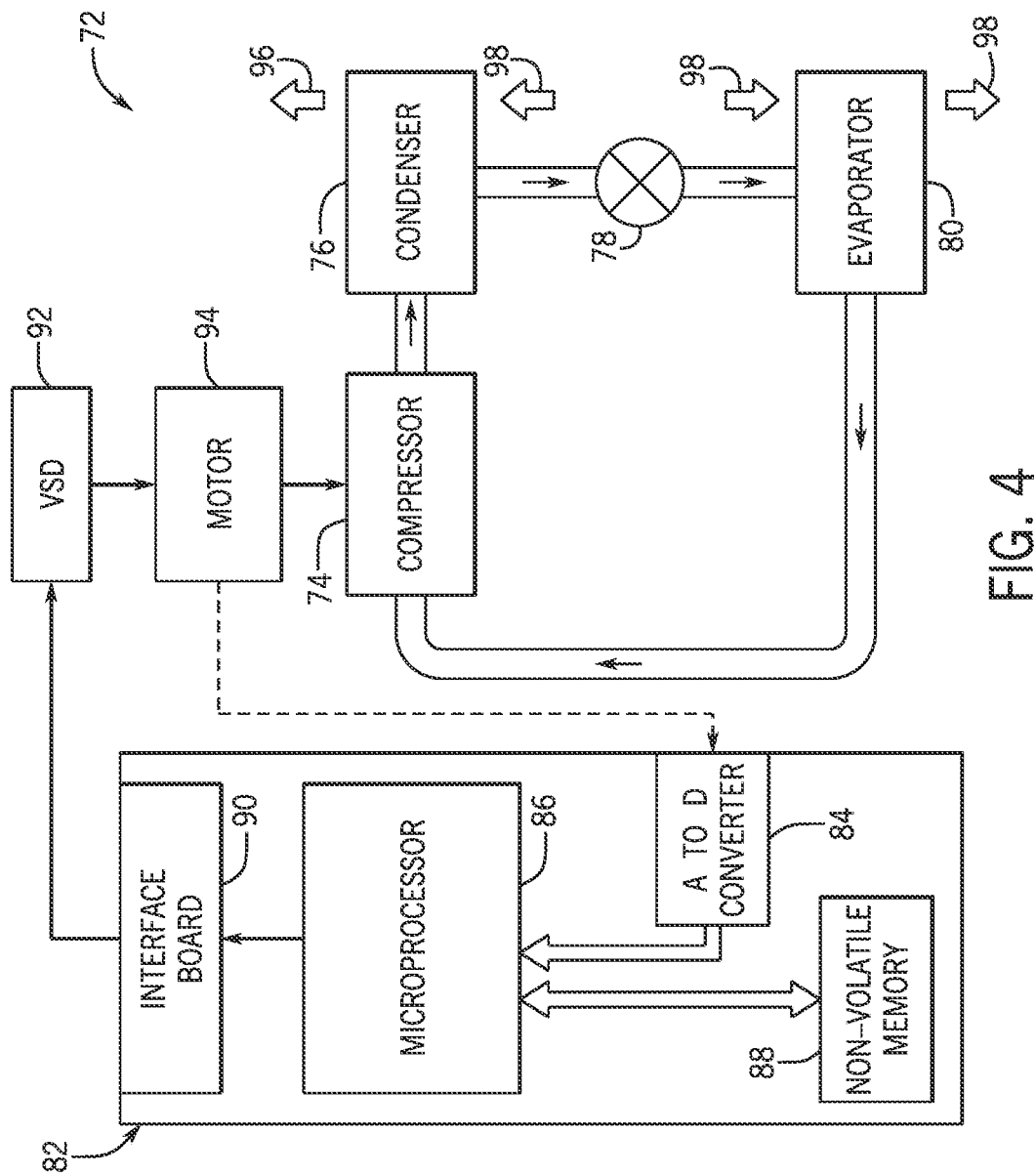
FIG. 4 is a schematic illustration of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the loop.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, any of the systems illustrated in FIGS. 1-4 may include two stage HVAC equipment, such as a two stage furnace, configured to operate in multiple stages of operation (e.g., first and second stages) and a controller that employs a recovery mode algorithm for determining if and when to initiate second stage operation of the two stage HVAC equipment. As previously described, two stage HVAC equipment, such as a two stage furnace, may be controlled to operate in a first stage operating mode providing a first amount of heat over a period of time and a second stage operating mode providing a second amount of heat over a comparable (e.g., same or similar) period of time, where the second amount being greater than the first amount. While two stage furnaces are described in detail below, it should be understood that the recovery mode algorithm described by in the present disclosure is also applicable to other two stage HVAC equipment, such as two stage cooling equipment (e.g., a refrigerant-based evaporator configured to absorb heat from an air flow) or other two stage heating equipment (e.g., an electric heater).

The two stage furnace may include one or more burners configured to receive fuel (e.g., gas) from a fuel source. A fuel valve (e.g., gas valve) associated with the two stage furnace may be controlled to supply a first amount of fuel (or first fuel rate) to the burner corresponding to the first stage operating mode and to supply a second amount of fuel (or second fuel rate) to the burner corresponding to the second stage operating mode, where the second amount of fuel or the second fuel rate is greater than the first amount of fuel or first fuel rate. The burners may also receive an oxidant and may ignite a fuel-oxidant mixture to generate combustion products routed through heat exchange tubes or coils of the two stage furnace. The first stage operating mode may generate a smaller amount of combustion products than the second stage operating mode based on the above-described differences in fuel amount or fuel rate. A controller of the two stage furnace may determine if and when second stage operation should be initiated. For example, in certain conditions, second stage operation, which provides a greater amount of combustion products than first stage operation, may enable temperature control of the environment (e.g., enclosed space) at a faster rate than first stage operation. Further, in certain conditions, first stage operation, which provides a lesser amount of combustion products than second stage operation, may enable temperature control of the environment (e.g., enclosed space) in a less expensive or more efficient manner. In general, the controller may execute a recovery mode algorithm, in accordance with the present disclosure, to determine if and when to initiate second stage operation of the two stage furnace in order to strike a desired balance between conditioning efficiency and conditioning speed. The recovery mode algorithm and associated controls may enable improved heat exchange efficiency and conditioning time. The above-described features are described in detail below with reference to FIGS. 5-10.

Figure 5:
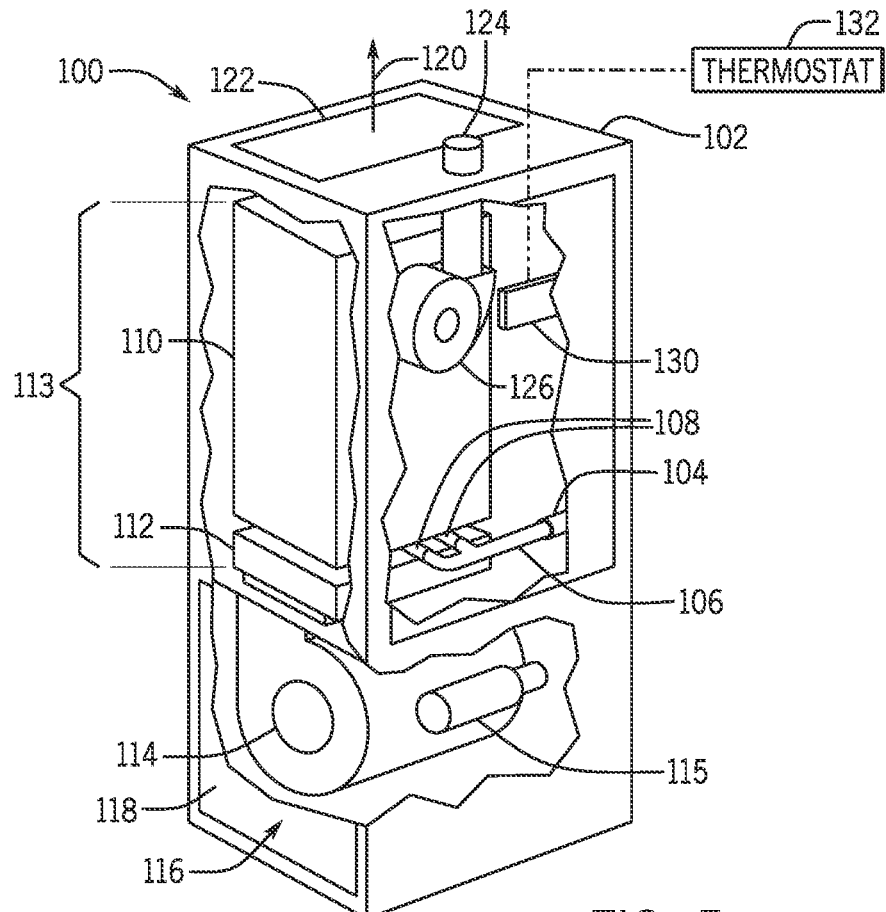
FIG. 5 is a perspective view of an embodiment of a furnace having a controller communicatively coupled to a thermostat, in accordance with an aspect of the present disclosure.

FIG. 5 is a perspective view of an embodiment of a furnace 100, which may be incorporated any of the systems or units illustrated in FIGS. 1-4 or any other suitable HVAC system. The furnace 100 includes a controller 130 communicatively coupled to a thermostat 132. In the illustrated embodiment, the furnace 100 also includes a housing 102 in which or on which a number of components of the furnace 100 are disposed. For example, the furnace 100 includes a fuel valve 104 (referred to in certain instances below as a gas valve) controllable to supply amounts of fuel (e.g., gas) through piping 106 to one or more burners 108 of the furnace 100. The burner 108 are configured to combust a mixture of the fuel (e.g., gas) and oxidant to generate combustion products routed through a primary heat exchanger 110 (e.g., primary heat exchange tubes or coils) and a secondary heat exchanger 112 (e.g., secondary heat exchange tubes or coils). The primary heat exchanger 112 and the secondary heat exchanger 112 may collectively be referred to as a heat exchange assembly 113. As similarly discussed above, the furnace 100 may be a two stage furnace (e.g., multiple stage furnace) configured to operate in two or more stages (e.g., operating stages).

In some embodiments, the primary heat exchanger 100 is fluidly coupled with the secondary heat exchanger 112, such that the combustion products are passed from the primary heat exchanger 100 to the secondary heat exchanger 112. Further, in some embodiments, the tubes or coils associated with the primary heat exchanger 110 may differ in number, size, shape, and/or material from the tubes or coils associated with the secondary heat exchanger 112. A fan 114 (e.g., circulating fan, a blower, etc.) of the furnace 100, driven by a motor 115 (e.g., electric blower motor), may draw a cold air flow 116 into the furnace 100. For example, the cold air flow 116 may be directed through a filter 118 of the furnace 100, and the cold air flow 116 may subsequently be directed (e.g., sequentially) across the second heat exchanger 112 and the primary heat exchanger 110. The combustion products passing through the primary heat exchanger 110 and the secondary heat exchanger 112 may heat the cold air flow 116 to convert the cold air flow 116 to a heated air flow 120 that is directed through an outlet 122 of the furnace 100 (e.g., to a duct associated with the building in which the furnace 100 is utilized). The duct may be a part of ductwork that directs the heated air flow 120 toward an environment (e.g., enclosed space) conditioned by the furnace 100 and/or other HVAC componentry.

The furnace 100 also includes a vent 124 (e.g., exhaust vent, piping, such as polyvinyl chloride [PVC] piping or acrylonitrile butadiene styrene [ABS] plastic piping) fluidly coupled with the heat exchange assembly 113. For example, a draft inducing fan or blower 126 may be fluidly coupled to, and between, the heat exchange assembly 113 and the vent 124. The draft inducing fan 126 may be configured to draw the combustion products through the tubes or coils of the heat exchange assembly 113 and pass the combustion products to the vent 124, which vents or discharges the combustion products to an external (e.g., ambient) environment outside of the building serviced by the furnace 100.

The controller 130 of the furnace 100 may be employed to control operation of one or more of the various above-described components of the furnace 100. The illustrated controller 130 is disposed inside the housing 102 of the furnace 100, but it should be understood that the controller 130 may be disposed on the housing 102 (e.g., on an external surface of the housing 102), in another location separate from the furnace 100, or in a different location of the housing 102 than shown in the illustrated embodiment. Indeed, in some embodiments, operation of components of the furnace 100 may be controlled by another controller (e.g., control board 48, control panel 82, etc.) in addition to and/or instead of the controller 130. In accordance with present embodiments, the controller 130 may be configured to execute a recovery mode algorithm to determine if and when to initiate a second stage operating mode of the furnace 100.

For example, the illustrated furnace 100 may include a first stage operating mode in which a first amount of fuel (e.g., gas) is directed to the burners 108 of the furnace 100, by way of the gas valve 104 and the piping 106, for generating a first amount of combustion products that provide a first amount of heat over a period of time. The furnace 100 may also include a second stage operating mode in which a second amount of fuel (e.g., gas) is directed to the burners 108 of the furnace 100, by way of the gas valve 104 and the piping 106, for generating a second amount of combustion products that provide a second amount of heat over a comparable period of time (e.g., same or similar period of time). As discussed above, the second amount of fuel may be greater than the first amount of fuel, and the second amount of combustion products (and resulting heat) is greater than the first amount of combustion products (and resulting heat). The controller 130 may control a setting (e.g., a position) of the gas valve 104 to correspond to the first operating mode or the second operating mode. That is, the controller 130 may control the setting of the gas valve 104 to cause the above-described first amount of fuel (e.g., an amount of fuel provided at a first rate) to be directed to the burners 108 in response to initiation of the first stage operating mode, and the controller 130 may control the setting of the gas valve 104 to cause the above-described second amount of fuel (e.g., an amount of fuel provided at a second flow rate greater than the first flow rate) to be directed to the burners 108 in response to initiation of the second operating mode.

The controller 130 may also adjust a speed of the draft inducing fan 126 that, as described above, is configured to draw and/or force the combustion products through the heat exchange assembly 113 and to the vent 124. For example, the controller 130 may control the draft inducing fan 126 to run at a first speed corresponding to the first stage operating mode and a second speed corresponding to the second stage operating mode, where the second speed is greater than the first speed. In doing so, heat exchange efficiency may be improved, delays in conditioning the enclosed space serviced by the furnace 100 are reduced, and combustion products are blocked from aggregating in, or causing undesirable effects to, the heat exchange assembly 113 of the furnace 100. In general, thresholds may define a distinction between first stage operation and second stage operation. For example, providing a first amount of fuel or a first fuel flow rate under a threshold amount or rate may be indicative of and/or associated with first stage operation, and providing a second amount of fuel or a second fuel flow rate above the threshold amount or rate may be indicative of and/or associated with second stage operation. In some embodiments, a ratio may govern first stage operation and second stage operation characteristics. For example, first stage operation may be characterized by a first amount of fuel or fuel flow rate and second stage operation may be characterized by a second amount of fuel or fuel flow rate, where the first amount of fuel or fuel flow rate is a percentage (e.g., 50%) of the second amount of fuel or fuel flow rate.

As previously described, the controller 130 may determine if and when to initiate second stage operation based on a recovery mode algorithm that considers characteristics of recent cycles of the furnace 100. In accordance with the present disclosure, the term "cycle" or "furnace cycle" may refer to a time period beginning when operation of the furnace 100 is initiated in response to a first thermostat call and ending when a second thermostat call after the first thermostat call is received (e.g., after the first thermostat call is satisfied). In accordance with the present disclosure, the term "elapsed time" may refer to a time period beginning when operation of the furnace 100 is stopped after a first thermostat call is satisfied and ending when a second thermostat call after the first thermostat call is received to initiate operation of the furnace.

In the recovery mode algorithm employed by the controller 130, each previously satisfied call from the thermostat 132 may be associated with a cycle of the two stage furnace 100 that was used to satisfy the call. As discussed above, the controller 130 may be communicatively coupled with the thermostat 132 and configured to receive a call (e.g., a call for heating) from the thermostat 132. It should be noted that the thermostat 132 may be a wall-mounted device, a handheld device such as a smart phone, or some other device communicatively coupled to the furnace 100 (e.g., via a network, such as a wired network or a wireless network). In general, the thermostat 132 may be configured to receive an input (e.g., via a user interface of the thermostat 132, which may include buttons, a display, a graphic user interface [GUI], or any combination thereof) indicative of a desired temperature of the conditioned space (e.g., a set point temperature).

In one embodiment, the thermostat 132 may call for a temperature increase (e.g., a difference between the desired temperature and a current temperature of the conditioned space) of a certain number of degrees (e.g., Fahrenheit, Celsius) in the enclosed space serviced by the furnace 100. The call may be in the form of a value indicative of a desired temperature differential, a value indicative of the desired temperature, a first value indicative of the desired temperature and a second value indicative of a current temperature, or the like. The controller 130 may receive the call from the thermostat 132 and, in response to the call, execute the recovery mode algorithm to determine a stage up time (e.g., an amount of time during which first stage operation is employed for furnace 100 operation and after which second stage operation is initiated for furnace 100 operation if the call is not satisfied prior to expiration of the stage up time). For example, if the determined stage up time is 12 minutes, the two stage furnace 100 is controlled to operate in the first stage operating mode for at most 12 minutes, and if the call from the thermostat 132 is not satisfied (e.g., the desired temperature in the conditioned space is not achieved) by the first stage operating mode before or by expiration of 12 minutes, then the two stage furnace 100 is controlled to operate in the second stage operating mode until the call from the thermostat 132 is satisfied.

The recovery mode algorithm employed to determine the above-described stage up time may be based at least in part on recent (e.g., previous) cycles of the furnace 100 (e.g., a predetermined number of recent cycles), such as whether the recent cycles, which satisfied previous calls from the thermostat 132, operated in second stage operation, an elapsed time from a most recent (e.g., previous) cycle of the furnace 100 and a current cycle, and/or a comparison of the elapsed time to a threshold time period. Values assigned to first stage cycles and values assigned to second stage cycles may also be factors in the determination by the recovery mode algorithm. As noted above, a "first stage cycle" may refer to a cycle that was completed without initiating second stage operation. A "second stage cycle" may refer to a cycle that was completed with operation of the furnace 100 in second stage operation (e.g., second stage cycles may include first stage operation and then include second stage operation to satisfy the call from the thermostat 132). Certain of the values assigned to second stage cycles may be greater than certain of the values assigned to first stage cycles. For example, a value for a fifth most recent cycle that corresponds to a second stage cycle may be greater than a value for a fifth most recent cycle that corresponds to a first stage cycle. Further, the values assigned to more recent cycles (e.g., first most recent cycle) may be greater than the values assigned to less recent cycles (e.g., fifth most recent cycle).

The recovery mode algorithm may determine a sum of the values corresponding to each of the most recent cycles (e.g., selected based on whether the cycle included first stage operation without second stage operation or whether the cycle included second stage operation), which is referred to herein as a weighted sum. Thus, if a most recent cycle was a first stage operating cycle, an appropriate (e.g., predetermined) value corresponding to a first most recent first stage operating cycle is assigned, and if a second most recent cycle was a second stage operating cycle, an appropriate (e.g., predetermined) value corresponding to a second most recent second stage operating cycle is assigned, and so on and so forth. The various values for recent cycles over the sample size utilized (e.g., five most recent cycles of the furnace 100) are added together to generate the above-described weighted sum. It should be noted that the sample size of recent cycles (e.g., cycles most recently completed prior to the current cycle) of the furnace 100 utilized to calculate the weighted sum may be any suitable or desired number of recent cycles. For example, the sample size may be the two most recent cycles, the three most recent cycles, the four most recent cycles, the five most recent cycles, the six most recent cycles, the seventh most recent cycles, and so on and so forth.

The recovery mode algorithm may include a comparison of the elapsed time from the most recent cycle (e.g., first most recent cycle) to the current cycle and the threshold time period. If the elapsed time meets or exceeds the threshold time period, the stage up time may be quicker than if the elapsed time falls below the threshold time period. In certain embodiments, the recovery mode algorithm may determine a stage up time based on the comparison and the weighted sum. For example, if the elapsed time falls below the threshold time period, the stage up time may be longer than when the elapsed time meets or exceeds the threshold time period for the same weighted sum.

The recovery mode algorithm employs additional features described in detail below with reference to later drawings. However, in general, a result (e.g., determination, output, or outcome) of the recovery mode algorithm may be at least in part a function of the above-described weighted sum, elapsed time, and threshold time period. The output or outcome includes a stage up time during which the controller 130 operates the furnace 100 in the first stage operating mode and, if the call from the thermostat 132 is not satisfied prior to the stage up time expiring or lapsing, after which the controller 130 operates the furnace 100 in the second stage operating mode. These and other features are described in detail below with reference to later drawings.

Figure 6:
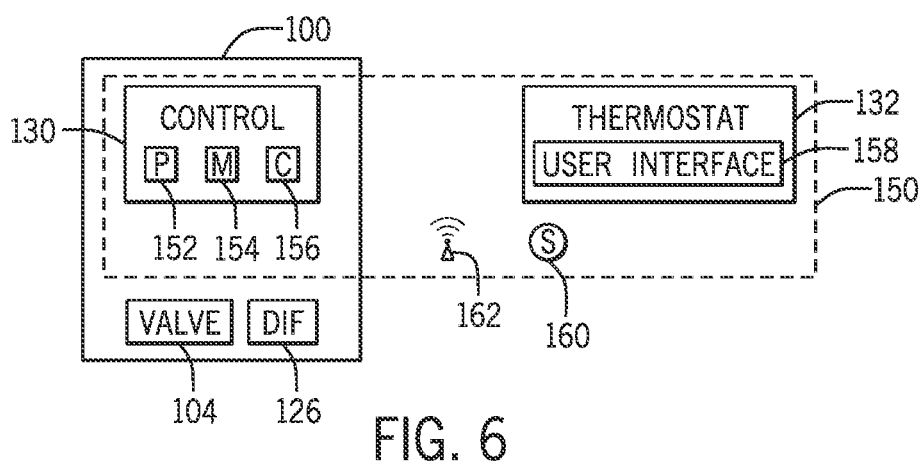
FIG. 6 is a schematic illustration of an embodiment of a control assembly for a furnace, in accordance with an aspect of the present disclosure.

FIG. 6 is a schematic illustration of an embodiment of a control assembly 150 for the furnace 100 (or other two stage heating or cooling equipment, as previously described). In the illustrated embodiment, the control assembly 150 includes the above-described controller 130, which includes processing circuitry 152, a memory 154 (e.g., non-transitory, computer-readable media having instructions stored thereon), communication circuitry 156, the above-described thermostat 132, which includes a user interface 158, and a sensor 160 (e.g., a temperature sensor). The memory 154 may include instructions stored thereon that, when executed by the processing circuitry 152, cause the controller 130 to perform various functions (e.g., execute a recovery mode algorithm in accordance with the present disclosure). The controller 130, the thermostat 132, and the sensor 160 may be communicatively coupled to one another via a wired and/or wireless arrangement (e.g., via a network system 162, such as an Internet system). As previously described, the controller 130 (e.g., the processing circuitry 152) may be configured to receive a call (e.g., a single stage call) for heating from the thermostat 132 (e.g., a single stage thermostat). In response to receiving the call, the controller 130 may execute a recovery mode algorithm to determine a stage up time during which the furnace 100 is operated in first stage operation and, if the call is not satisfied prior to the stage up time expiring, after which the furnace 100 is operated in second stage operation to satisfy the call. In some embodiments, the controller 130 may execute the recovery mode algorithm before initializing a heating operation (e.g., first stage operation) of the furnace 100 (e.g., before operating the gas valve 104, burners 108, and/or draft inducing fan 126). In other embodiments, the controller 130 may execute the recovery mode algorithm and initialize the heating operation (e.g., first stage operation) concurrently.

The sensor 160 may be a temperature sensor that detects a temperature in the space being conditioned by the furnace 100. When the temperature detected by the sensor 160 indicates that the call from the thermostat 132 is satisfied, the controller 130 may control the furnace 100 to stop the cycle (e.g., stop operation of the furnace 100) until another call is received from the thermostat 132.

As previously described, first stage operation (and in some instances second stage operation) may be employed to satisfy the call from the thermostat 132 based on a recovery mode algorithm executed by the controller 130 for determining a stage up time during which first stage operation is employed and after which second stage operation is employed. During first stage operation, the controller 130 may control the gas valve 104 and the draft inducing fan 126 of the furnace 126 as previously described. For example, the controller 130 may control the gas valve 104 to provide fuel to the furnace 100 at a first fuel flow rate (e.g., a first amount of fuel over a period of time) corresponding to the first stage operation. The controller 130 may also control the draft inducing fan 126 to operate at a first fan speed to force combustion products through the furnace 100 at a first rate corresponding to the first stage operation. Likewise, during the second stage operation, the controller 130 may control the gas valve 104 and the draft inducing fan 126 of the furnace 100 as previously described. For example, the controller 130 may control the gas valve 104 to provide fuel to the furnace 100 at a second fuel flow rate (e.g., a second amount of fuel over a period of time) corresponding to the second stage operation. The controller 130 may also control the draft inducing fan 126 to operate at a second fan speed to force combustion products through the furnace 100 at a second rate corresponding to the second stage operation. In general, the second fuel rate corresponding to the second stage operation may be greater than the first fuel rate corresponding to the first stage operation, and the second fan speed corresponding to the second stage operation may be greater than the first fan speed corresponding to the first stage operation.

The recovery mode algorithm outputs the above-described stage up time, which is a function of cycle characteristics of recent cycles of the furnace 100 executed to satisfy recent calls from the thermostat 132, the elapsed time from an end of the most recent cycle to a beginning of the current cycle, and the threshold time period. For example, a weighted sum of various values assigned to first stage cycles of the two stage furnace 100 and/or values assigned to second stage cycles of the two stage furnace 100 may be utilized in the recovery mode algorithm. Additionally, the elapsed time may be compared to the threshold time period and the comparison may be utilized in the recovery mode algorithm. As previously described, a first stage cycle refers to a cycle that is completed (e.g., satisfying a call from the thermostat 132) without initiating second stage operation. A second stage cycle refers to a cycle that is completed (e.g., satisfying a call from the thermostat 132) utilizing second stage operation (e.g., the second stage cycle may include first stage operation and then second stage operation to satisfy the call).

FIG. 7 is an illustration of an embodiment of various tables including values utilized for determining a weighted sum and a weighted percentage based on most recent cycles of the furnace 100. Table 170 and table 180 (and/or data corresponding to the tables 170 and 180) may be stored to the memory 154 of the controller 130 or a database communicatively coupled with the controller 130. That is, the table 170 may be a reference table, and the table 180 may be a reference table. The table 170 includes values assigned to hypothetical recent first stage cycles of the furnace 100. As previously described, a first stage cycle is one in which first stage operation is employed but second stage operation is not employed by the furnace 100 to satisfy a thermostat call. In the illustrated embodiment, the table 170 includes a value ($A_1$) assigned to a hypothetical fifth most recent first stage cycle, a value ($B_1$) assigned to a hypothetical fourth most recent first stage cycle, a value ($C_1$) assigned to a hypothetical third most recent first stage cycle, a value ($D_1$) assigned to a hypothetical second most recent first stage cycle, and a value ($E_1$) assigned to a hypothetical first most recent first stage cycle. Accordingly, a minimum possible weighted sum, referred to herein as the minimum weighted sum ($WS_{MIN}$), corresponds to a hypothetical scenario where the five most recent cycles of the furnace 100 are all first stage cycles and is equal to $A_1+B_1+C_1+D_1+E_1$. In general, more recent cycles are assigned higher values. For example, $E_1$ is greater than $D_1$, $D_1$ is greater than $C_1$, $C_1$ is greater than $B_1$, and $B_1$ is greater than $A_1$. In some embodiments, the values may be multiples of one another. For example, in one embodiment, $E_1$ may be two times greater than $D_1$, $D_1$ may be two times greater than $C_1$, $C_1$ may be two times greater than $B_1$, and $B_1$ may be two times greater than $A_1$.

The table 180 includes values assigned to hypothetical recent second stage cycles of the furnace 100. As previously described, a second stage cycle is one in which second stage operation is employed (e.g., even if first stage operation is also first employed) by the furnace 100 to satisfy a thermostat call. That is, the combination of first stage operation and then second stage operation to satisfy a thermostat call is considered a second stage cycle. In the illustrated embodiment, the table 180 includes a value ($A_2$) assigned to a hypothetical fifth most recent second stage cycle, a value ($B_2$) assigned to a hypothetical fourth most recent second stage cycle, a value ($C_2$) assigned to a hypothetical third most recent second stage cycle, a value ($D_2$) assigned to a hypothetical second most recent second stage cycle, and a value ($E_2$) assigned to a hypothetical first most recent second stage cycle. Accordingly, a maximum possible weighted sum, referred to herein as the maximum weighted sum ($WS_{MAX}$), corresponds to a hypothetical scenario where the five most recent cycles of the furnace are all second stage cycles and is equal to $A_2+B_2+C_2+D_2+E_2$. The maximum weighted sum is so described, and the minimum weighted sum is so described, because second stage cycles are assigned higher values than first stage cycles on a cycle-by-cycle basis. That is, $A_2$ is great than $A_1$, $B_2$ is great than $B_1$, $C_2$ is great than $C_1$, $D_2$ is great than $D_1$, and $E_2$ is great than $E_1$. In some embodiments, the values may be multiples of one another. For example, in one embodiment, $A_2$ may be two times greater than $A_1$, $B_2$ may be two times greater than $B_1$, $C_2$ may be two times greater than $C_1$, $D_2$ may be two times greater than $D_1$, and $E_2$ may be two times greater than $E_1$. Further, as previously described with respect to the table 170, the table 180 may assign higher values to more recent cycles. For example, $E_2$ is greater than $D_2$, $D_2$ is greater than $C_2$, $C_2$ is greater than $B_2$, and $B_2$ is greater than $A_2$. In some embodiments, the values may be multiples of one another. For example, in one embodiment, $E_2$ may be two times greater than $D_2$, $D_2$ may be two times greater than $C_2$, $C_2$ may be two times greater than $B_2$, and $B_2$ may be two times greater than $A_2$.

Based on the above-described reference tables 170, 180, a weighted sum is calculated in view of the actual most recent cycles of the furnace 100 and whether the actual most recent cycles are first stage cycles or second stage cycles. Table 190 is representative of a weighted sum calculation for five hypothetical most recent cycles of the furnace 100. For example, the table 190 illustrates a scenario where the fifth most recent cycle of the furnace 100 was a first stage cycle ($A_1$ from the table 170), a fourth most recent cycle was a first stage cycle ($B_1$ from the table 170), a third most recent cycle was a second stage cycle ($C_2$ from the table 180), a second most recent cycle was a first stage cycle ($D_1$ from the table 170), and a most recent cycle was a second stage cycle ($E_2$ from the table 180). The weighted sum includes a sum of these values. Thus, the weighted sum with respect to the scenario outlined in the table 190 is $A_1+B_1+C_2+D_1+E_1$.

The weighted sum calculated as illustrated above may be included in a calculation of a percentage, referred to herein as a weighted percentage. The weighted percentage may be calculated via the following (Equation 1):

$$\text{Weighted \%} = \frac{\text{Weighted Sum } (WS) - \text{Minimum Weighted Sum } (WS_{MIN})}{\text{Maximum Weighted Sum } (WS_{MAX}) - \text{Minimum Weighted Sum } (WS_{MIN})} * 100$$

The weighted percentage (i.e., "Weighted %" in Equation 1 above) may then be used to calculate a current average weighted percentage. The current average weighted percentage may calculated via the following equation (Equation 2):

$$\text{Current Average Weighted \%} = \frac{\text{Previous Average Weighted \%} + \text{Weighted \%}}{2}$$

The previous average weighted percentage may be effectively the current average weighted percentage calculated for the most recent previous thermostat call and corresponding most recent furnace cycle that satisfied the most recent previous thermostat call. Because the previous average weighted percentage is based on historical cycles of the furnace 100 extending to an installation of the present recovery mode algorithm techniques, an initiation sequence, described in detail with reference to later drawings, may be utilized over the first several furnace 100 cycles to accommodate for parameters in the calculations above that would otherwise be missing or incomplete based on a lack of previous cycles to consider. After the initiation sequence, the calculations described above and the additional processing described in detail below (e.g., consulting a reference table based on the calculated current average weighted percentage to locate an appropriate stage up time) are utilized.

Figure 8:
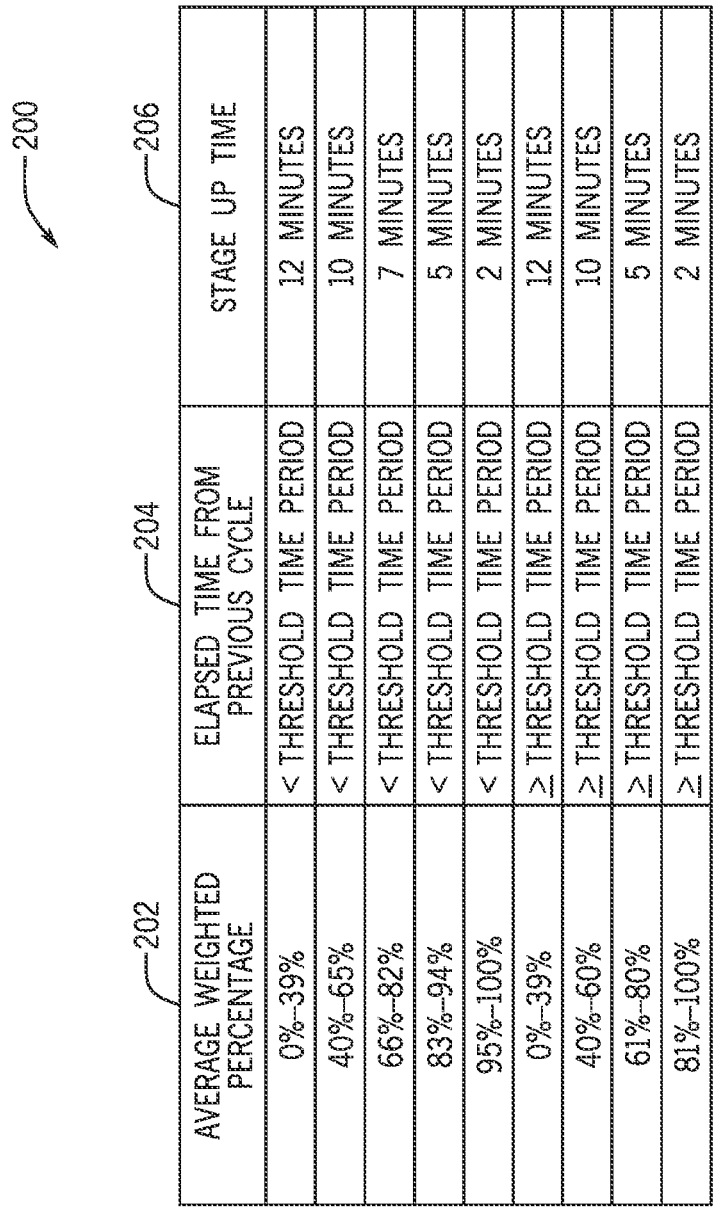
FIG. 8 is an illustration of a table including multiple percentage ranges, multiple elapsed times, and multiple stage up times corresponding to the multiple percentage ranges and multiple elapsed times, for determining a stage up time of a furnace, in accordance with an aspect of the present disclosure.

FIG. 8 is an illustration of an embodiment of a table 200 including multiple percent ranges between 0% and 100% (e.g., average weighted percentages ranges), multiple elapsed times from a previous (e.g., most recent) cycle of the furnace 100, and multiple stage up times corresponding to the multiple percent ranges between 0% and 100% and elapsed times, for determining a stage up time of the furnace 100 utilized to satisfy a pending thermostat call. The illustrated table 200, or data corresponding to, indicative of, or representative of the table 200, may be stored to the memory 154 of the controller 130. In FIG. 8, the table 200 includes a first column 202 having various percent ranges between 0 and 100% (e.g., 0%-39%, 40%-60%, 40%-65%, 61%-80%, 66%-82%, 81%-100%, 83%-94%, and 95%-100%.) The illustrated percent ranges are mere examples and may differ in other embodiments. Indeed, a larger number of smaller percent ranges may be included, or a smaller number of larger percent ranges may be included, or the same number of percent ranges may be included but with different ranges (e.g., 0%-45%, 46%-60%, 61%-75%, 76%-85%, and 86%-100%). The table 200 also includes a second column 204 indicating whether an elapsed time from a previous cycle is less than a threshold time period or meets or exceeds a threshold time period. For example, the threshold time period may be any duration (e.g., thirty minutes, one hour, two hours, three hours, four hours, and so forth) and may be adjusted by a user. The threshold time period may also be stored in the memory 154 of the controller 130. The stage up time for the HVAC equipment may be calculated using a first function if the elapsed time is less than the threshold time period and may be calculated using a second function if the elapsed time meets or exceeds the threshold time period.

The table 200 also includes a third column 206 having stage up times corresponding to each of the percent ranges presented in the first column 202 and elapsed times presented in the second column 204. For example, the third column 204 includes a stage up time of 12 minutes corresponding to the first range of 0%-39% and the elapsed time being below the threshold time period, a stage up time of 10 minutes corresponding to the second range of 40%-65% and the elapsed time being below the threshold time period, a stage up time of 7 minutes corresponding to the third range of 66%-82% and the elapsed time being below the threshold time period, a stage up time of 5 minutes corresponding to the fourth range of 83%-94% and the elapsed time being below the threshold time period, a stage up time of 2 minutes corresponding to the fifth range of 95%-100% and the elapsed time being below the threshold time period, a stage up time of 12 minutes corresponding to the sixth range of 0%-39% and the elapsed time meeting or exceeding the threshold time period, a stage up time of 10 minutes corresponding to the seventh range of 40%-60% and the elapsed time meeting or exceeding the threshold time period, a stage up time of 5 minutes corresponding to the eighth range of 61%-80% and the elapsed time meeting or exceeding the threshold time period, and a stage up time of 2 minutes corresponding to the ninth range of 81%-100% and the elapsed time meeting or exceeding the threshold time period. As previously noted, the current average weighted percentage calculated via Equation 2 may correspond to one or more of the percent ranges included in the first column 202 of the table 200. For example, if the current average weighted percentage calculated via Equation 2 is 42%, then the current average weighted percentage calculated via Equation 2 corresponds to either the second percent range of 40%-65% or the seventh percent range of 40%-60%, both of which correspond to a stage up time of 10 minutes in the third column 206 of the table 200. While the stage up time for a current average weighted percentage of 42% may be the same regardless of the elapsed time from the previous (e.g., most recent) cycle of the furnace 100, the stage up time may differ for other average weighted percentages based on the elapsed time from the previous cycle. For example, if the current average weighted percentage calculated via Equation 2 is 63%, then the current average weighted percentage calculated via Equation 2 corresponds to either the second percent range of 40%-65% or the eighth percent range of 61%-80%. As such, the controller 130 may determine the elapsed time from the previous (e.g., most recent) cycle, may compare the elapsed time to the threshold time period, and may determine the corresponding stage up time accordingly. For example, if the threshold time period is two hours and the elapsed time since the previous cycle is two hours, then the elapsed time meets or exceeds the threshold time period which corresponds to the eighth percent range of 61%-80% and the stage up time of 5 minutes in the third column 206 of the table 200. Alternatively, if the elapsed time since the previous cycle is one hour, then the elapsed time falls below or fails to meet or exceed the threshold time period which corresponds to the second percent range of 40%-65% and a stage up time of 10 minutes. It should be noted that, if the current average weighted percentage calculated via Equation 2 is not a whole number, the current average weighted percentage may be rounded up or down. Additionally or alternatively, the first column 202 of the table 200 may include percent ranges having decimals to more acutely define and interrelate the percent ranges (e.g., the first percent range may be 0%-39.99%, the second percent range may include 40%-65.99%, the third percent range may include 66%-82.99%, the fourth range may include 83%-94.99%, and the fifth range may include 95%-100%). The stage up time determined by the controller 130 based at least in part on the table 200 may then be utilized by the controller 130 to determine if and when to stage up from first stage operation to second stage operation to satisfy the current thermostat call.

Figure 9:
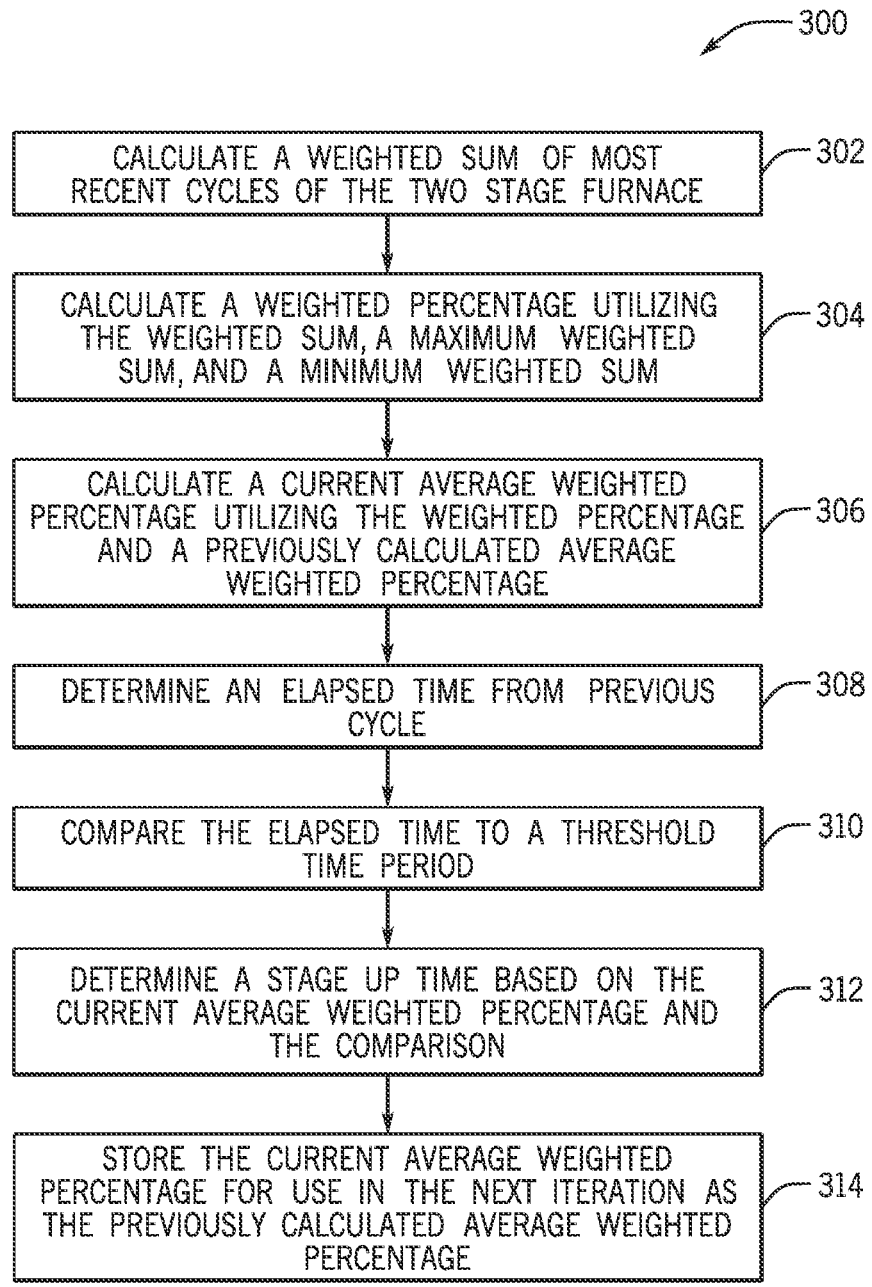
FIG. 9 is a process flow diagram illustrating an embodiment of a method of executing a recovery algorithm for two stage HVAC equipment, such as a furnace, in accordance with an aspect of the present disclosure.

FIG. 9 is a process flow diagram illustrating an embodiment of a method 300 of executing a recovery mode algorithm, in accordance with the present techniques. In the illustrated embodiment, the method 300 includes calculating (block 302) a weighted sum of most recent cycles of a two stage furnace (e.g., furnace 100). The weighted sum may be calculated as described above with reference to FIG. 7. For example, the weighted sum is calculated based on values assigned to most recent cycles of the furnace 100, the values being dependent on whether each recent cycle at issue is a first stage cycle or a second stage cycle, and then summing the values to arrive at the weighted sum.

The illustrated method 300 also includes calculating (block 304) a weighted percentage utilizing the weighted sum calculated in block 304, a maximum weighted sum, and a minimum weighted sum. For example, the maximum weighted sum is a sum based on a hypothetical scenario in which all of the most recent cycles at issue (e.g., five most recent cycles) are second stage cycles, and the minimum weighted sum is a sum based on a hypothetical scenario in which all of the most recent cycles at issue (e.g., five most recent cycles) are first stage cycles. The weighted percentage, which is a function of the weighted sum, the maximum weighted sum, and the minimum weighted sum, may be calculated based on Equation 1 in the description above.

The illustrated method 300 also includes calculating (block 306) a current average weighted percentage utilizing the weighted percentage calculated in block 304 and a previous (e.g., most recent) weighted average weighted percentage calculated for the most recent thermostat call satisfied by the furnace 100. For example, the current average weighted percentage, as described above, is calculated based on the most recent furnace cycles via Equation 1. The previous average weighted percentage corresponds to the current average weighted percentage calculated for the most recent satisfied thermostat call and corresponding completed furnace cycle. In this way, the previous average weighted percentage is a function of all the recent cycles except for the most recent cycle (i.e., excludes the most recent cycle) and historical furnace cycles prior to the most recent cycles.

The illustrated method 300 also includes determining (block 308) an elapsed time from a most recent cycle (e.g., a time period beginning when operation of the furnace is stopped after satisfying a first thermostat call and ending when a second thermostat call after the first thermostat call is received to initiate operation of the furnace.) The illustrated method 300 also includes comparing (block 310) the elapsed time to a threshold time period. The threshold time period may be stored in the memory 154 of the controller 130, and the controller 130 may determine whether the elapsed time falls below or meets or exceeds the threshold time period. For example, the controller 130 may determine the elapsed time is 30 minutes and the threshold time period is three hours. As such, the controller 130 may compare the elapsed time to the threshold time period and determine the elapsed time falls below the threshold time period.

The illustrated method 300 also includes determining (block 312) a stage up time based on the current average weighted percentage calculated in block 306, the elapsed time determined in block 308, and/or the comparison in block 310. For example, as previously described, a table (i.e., the table 200 of FIG. 8) having various ranges of percentages, elapsed times from a most recent cycle, and corresponding stage up times may be referenced based on the current average weighted percentage and the comparison between the elapsed time and the threshold time period. The percent range having the current average weighted percentage and the comparison between the elapsed time and the threshold time period are associated with a corresponding stage up time that is used to control the furnace 100 cycle for satisfying a current or pending thermostat call. As previously described, the furnace 100 cycle is operated in first stage operation until either the current thermostat call is satisfied or the stage up time expires. If the stage up time expires and the thermostat call has not been satisfied, then second stage operation is initiated until the thermostat call is satisfied. The illustrated method 300 also includes storing (block 314) the current average weighted percentage for use in the next iteration of the recovery mode algorithm (e.g., the next thermostat call following the current thermostat call) as the previous average weighted percentage.

Figure 10:
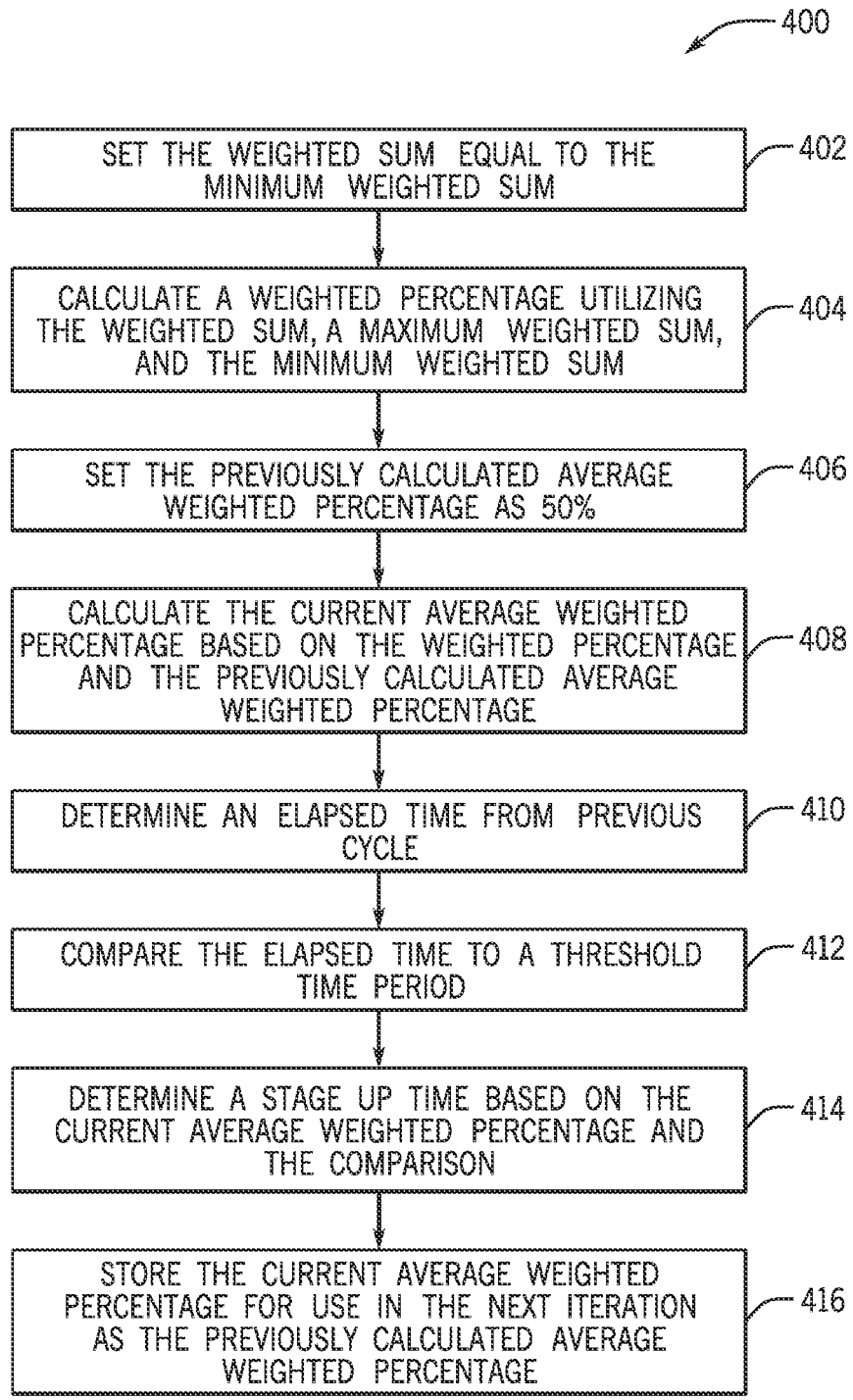
FIG. 10 is a process flow diagram illustrating an embodiment of a method of executing an initiation sequence for operating two stage HVAC equipment, such as a furnace, in accordance with an aspect of the present disclosure.

FIG. 10 is a process flow diagram illustrating an embodiment of a method 400 of executing an initiation sequence associated with initial operation of the furnace 100 and as a part of the above-described recovery mode algorithm. For example, as previously described, initial operation of the furnace 100 (e.g., after initial implementation of the control features described herein) may include an initiation sequence that replaces unavailable data points with selected values. In other words, because the recovery mode algorithm generally considers characteristics of recently completed furnace 100 cycles as part of determining stage up time, and because no such data may exist when the controls scheme disclosed herein is initially implemented, values (e.g., substitute values) may be utilized in place of the characteristics of recently completed furnace 100 cycles.

For example, the method 400 includes setting (block 402) the weighted sum equal to the minimum weighted sum. That is, to calculate the weighted sum, the recovery mode algorithm selects first stage operating values for each hypothetical recent furnace 100 cycle being included in the weighted sum. Accordingly, the weighted sum is equal to the minimum weighted sum. In a different embodiment, the recovery mode algorithm may select second stage operating values for each hypothetical recent furnace 100 cycle being included in the weighted sum. The method 400 also includes calculating (block 404) the weighted percentage utilizing the weighted sum (e.g., set to the minimum weighted sum), the minimum weighted sum, and the maximum weighted sum.

The method 400 also includes setting (block 406) the previously calculated weighted percentage as 50%. For example, after initial implementation of the recovery mode algorithm, a previously calculated weighted percentage has not been determined or calculated. Accordingly, the previously calculated weighted percentage is set to 50%. In a different embodiment, the previously calculated weighted percentage may be set to a different percentage for this very first cycle, such as 25% or 75%.

The method 400 also includes calculating (block 408) the average weighted percentage based on the weighted percentage and the previous average weighted percentage (e.g., where the previous average weighted percentage is set to 50%, as noted above). The equations associated with the various calculations at issue in blocks 408 and 404 are described in detail above with reference to earlier drawings.

The illustrated method 400 also includes determining (block 410) an elapsed time from a previous or most recent cycle (e.g., a time period beginning when operation of the furnace 100 is stopped after satisfying a first thermostat call and ending when a second thermostat call after the first thermostat call is received to initiate operation of the furnace 100.) The illustrated method 400 also includes comparing (block 412) the elapsed time to a threshold time period. The threshold time period may be stored in the memory 174 of the controller 130, and the controller 130 may determine whether the elapsed time falls below or meets or exceeds the threshold time period. For example, the controller 130 may determine the elapsed time is 30 minutes and the threshold time period is three hours. As such, the controller 130 may compare the elapsed time to the threshold time period and determine the elapsed time falls below the threshold time period.

The method 400 also includes determining (block 414) the stage up time based on the current average weighted percentage calculated at block 408. For example, the table 200 illustrated in FIG. 8 may be utilized to cross-reference the current average weighted percentage and the comparison between the elapsed time and the threshold time period with a corresponding stage up time. The method 400 also includes storing (block 416) the current average weighted percentage (e.g., in the memory 154 of the controller 130) for use in the next iteration as the previous average weighted percentage.

After block 416, the recovery mode algorithm may not set a value (e.g., predetermined value) for the previous average weighted percentage in the next iteration of the recovery mode algorithm. However, in a subsequent iteration, the furnace 100 will have been operated via the controls scheme described herein for at least one cycle, but the recovery mode algorithm may be generally configured to consider first stage or second stage characteristics of multiple recent cycles (e.g., the five most recent cycles). Accordingly, while the most recent cycle is known to be either a first stage cycle or second stage cycle, other recent cycles may not have actually been completed. The recovery mode algorithm may assign first stage cycle values for the other hypothetical recent cycles that have not actually occurred (e.g., second through fifth most recent cycles). That is, the most recent cycle may be a first stage or second stage cycle depending on whether second stage operation is utilized to satisfy the previous thermostat call, whereas the second most recent cycle, the third most recent cycle, the fourth most recent cycle, etc. are simply set by the recovery mode algorithm as first stage cycles for purposes of calculating the weighted sum in the next iteration (e.g., next thermostat call and furnace 100 cycle). This process may be repeated until enough cycles have been completed to operate the recovery mode algorithm as described with reference to FIGS. 5-9 above.

The present disclosure may provide one or more technical effects useful in the operation of an HVAC system. For example, the disclosed controls scheme employing the disclosed recovery mode algorithm may improve efficiency of two stage HVAC equipment (e.g., two stage furnace), a timeliness of conditioning an environment (e.g., enclosed space) via the two stage HVAC equipment, and an interface between the two stage HVAC equipment and thermostats, such as a single stage call thermostat.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A controller configured to control operation of multi-stage heating, ventilation, and air conditioning (HVAC) equipment, wherein the controller comprises:
   processing circuitry configured to receive a call for conditioning and, in response to the call for conditioning, execute a recovery mode algorithm to:
      determine an average weighted percentage value based on a plurality of values, wherein each value of the plurality of values is associated with a corresponding previous cycle of a plurality of previous cycles of the multi-stage HVAC equipment; and
      determine a stage up time of the multi-stage HVAC equipment based on the average weighted percentage value and based on an elapsed time between the call for conditioning and an ending of a recent cycle of the multi-stage HVAC equipment,
   wherein the processing circuitry is further configured to:
      initiate first stage operation of the multi-stage HVAC equipment; and in response to lapse of the stage up time without the call for conditioning being satisfied, increase an operating stage of the multi-stage HVAC equipment.

2. The controller of claim 1, wherein the processing circuitry is configured to execute, in response to the call for conditioning, the recovery mode algorithm to:
determine the elapsed time between the call for conditioning and the ending of the recent cycle of the multi-stage HVAC equipment;
compare the elapsed time to a threshold time period; and
in response to the elapsed time being below the threshold time period, determine the stage up time of the multi-stage HVAC equipment based on the average weighted percentage value and based on a first function corresponding to the elapsed time being below the threshold time period.

3. The controller of claim 2, wherein the processing circuitry is configured to execute, in response to the call for conditioning, the recovery mode algorithm to:
in response to the elapsed time being below the threshold time period:
determine that the average weighted percentage value is within a particular percentage value range of a plurality of percentage value ranges, wherein each percentage value range of the plurality of percentage value ranges is associated with a respective stage up time; and
select the respective stage up time corresponding to the particular percentage value range as the stage up time of the multi-stage HVAC equipment.

4. The controller of claim 2, wherein the processing circuitry is configured to execute, in response to the call for conditioning, the recovery mode algorithm to:
in response to the elapsed time meeting or exceeding the threshold time period, determine the stage up time of the multi-stage HVAC equipment based on the average weighted percentage value and based on a second function corresponding to the elapsed time meeting or exceeding the threshold time period.

5. The controller of claim 1, wherein the processing circuitry is configured to execute, in response to the call for conditioning, the recovery mode algorithm to:
determine the elapsed time between the call for conditioning and the ending of the recent cycle of the multi-stage HVAC equipment;
compare the elapsed time to a threshold time period; and
in response to the elapsed time meeting or exceeding the threshold time period:
determine whether the average weighted percentage value falls within a subset of a plurality of percentage value ranges;
determine, based on the average weighted percentage value falling within the subset of the plurality of percentage value ranges, the stage up time of the multi-stage HVAC equipment based on a first part of a function; and
determine, based on the average weighted percentage value falling outside the subset of the plurality of percentage value ranges, the stage up time of the multi-stage HVAC equipment based on a second part of the function.

6. The controller of claim 1, wherein the processing circuitry is configured to receive the call for conditioning from a single stage thermostat.

7. The controller of claim 1, wherein each value of the plurality of values is determined based on a respective operating stage utilized in the corresponding previous cycle of the plurality of previous cycles to satisfy a corresponding previous call for conditioning.

8. The controller of claim 1, wherein, to increase the operating stage of the multi-stage HVAC equipment, the processing circuitry is configured to:
adjust a fuel valve of a furnace to increase a flow rate of fuel supplied by the fuel valve;
adjust operation of a draft inducing fan of the furnace to increase a speed of the draft inducing fan; or
both.

9. A controller configured to control operation of multi-stage heating, ventilation, and air conditioning (HVAC) equipment, wherein the controller comprises:
processing circuitry; and
a memory comprising instructions stored thereon, wherein the instructions, when executed by the processing circuitry, cause the controller to:
receive a call for conditioning;
determine an elapsed time between receipt of the call for conditioning and an ending of a recent cycle of the multi-stage HVAC equipment;
compare the elapsed time to a threshold time period;
determine an average weighted percentage value based on a plurality of values, wherein each value of the plurality of values is associated with a corresponding previous cycle of a plurality of previous cycles of the multi-stage HVAC equipment; and
determine a stage up time of the multi-stage HVAC equipment based on the average weighted percentage value and based on comparison of the elapsed time to the threshold time period;
initiate first stage operation of the multi-stage HVAC equipment; and
in response to lapse of the stage up time without the call for conditioning being satisfied, initiate second stage operation of the multi-stage HVAC equipment.

10. The controller of claim 9, wherein the instructions, when executed by the processing circuitry, cause the controller to:
determine the stage up time of the multi-stage HVAC equipment based on a first function in response to the elapsed time being below the threshold time period; and
determine the stage up time of the multi-stage HVAC equipment based on a second function in response to the elapsed time meeting or exceeding the threshold time period.

11. The controller of claim 10, wherein the instructions, when executed by the processing circuitry, cause the controller to:
in response to the elapsed time meeting or exceeding the threshold time period:
determine whether the average weighted percentage value falls within a subset of a plurality of percentage value ranges;
in response to the average weighted percentage value falling within the subset of the plurality of percentage value ranges, determine the stage up time of the multi-stage HVAC equipment based on a first part of the second function; and
in response to the average weighted percentage value falling outside the subset of the plurality of percentage value ranges, determine the stage up time of the multi-stage HVAC equipment based on a second part of the second function.

12. The controller of claim 11, wherein the second part of the second function corresponds to a part of the first function.

13. The controller of claim 9, wherein the instructions, when executed by the processing circuitry, cause the controller to:
in response to the elapsed time being below the threshold time period:
determine that the average weighted percentage value is within a particular percentage value range of a plurality of percentage value ranges, wherein each percentage value range of the plurality of percentage value ranges is associated with a respective stage up time; and
select the respective stage up time corresponding to the particular percentage value range as the stage up time of the multi-stage HVAC equipment.

14. The controller of claim 9, wherein each value of the plurality of values is determined based on a respective operating stage utilized in the corresponding previous cycle of the plurality of previous cycles of the multi-stage HVAC equipment.

15. The controller of claim 9, wherein the instructions, when executed by the processing circuitry, cause the controller to receive the call for conditioning from a single stage thermostat.

16. A controller configured to control operation of multi-stage heating, ventilation, and air conditioning (HVAC) equipment, wherein controller comprises a non-transitory, computer-readable media having instructions stored thereon that, when executed by processing circuitry of the controller, are configured to cause the controller to:
receive a call for conditioning;
determine an average weighted percentage value based on a plurality of values, wherein each value of the plurality of values is associated with a corresponding previous cycle of a plurality of previous cycles of the multi-stage HVAC equipment, and wherein each value of the plurality of values is determined based on a respective operating stage utilized in the corresponding previous cycle of the plurality of previous cycles of the multi-stage HVAC equipment;
determine a stage up time of the multi-stage HVAC equipment based on the average weighted percentage value and based on an elapsed time between the call for conditioning and an ending of a recent cycle of the multi-stage HVAC equipment;
initiate first stage operation of the multi-stage HVAC equipment; and
in response to lapse of the stage up time without the call for conditioning being satisfied, initiate second stage operation of the multi-stage HVAC equipment.

17. The controller of claim 16, wherein the instructions, when executed by the processing circuitry of the controller, are configured to cause the controller to:
determine the elapsed time between the call for conditioning and the ending of the recent cycle of the multi-stage HVAC equipment;
compare the elapsed time to a threshold time period;
in response to the elapsed time being below the threshold time period, determine the stage up time of the multi-stage HVAC equipment based on a first function; and
in response to the elapsed time meeting or exceeding the threshold time period:
determine whether the average weighted percentage value falls within a subset of a plurality of percentage value ranges; and
in response to the average weighted percentage value falling within the subset of the plurality of percentage value ranges, determine the stage up time of the multi-stage HVAC equipment based on the first function.

18. The controller of claim 17, wherein the instructions, when executed by the processing circuitry of the controller, are configured to cause the controller to:
in response to the elapsed time meeting or exceeding the threshold time period and in response to the average weighted percentage value falling outside the subset of the plurality of percentage value ranges, determine the stage up time of the multi-stage HVAC equipment based on a second function.

19. The controller of claim 16, wherein the instructions, when executed by the processing circuitry of the controller, are configured to cause the controller to store the average weighted percentage value in a memory of the controller.

* * * * *